(12) United States Patent
Kataoka

(10) Patent No.: US 10,502,304 B2
(45) Date of Patent: Dec. 10, 2019

(54) DRIVE TRANSMISSION DEVICE FOR TRANSMITTING ROTARY DRIVE

(71) Applicant: CANON KABUSHIKI KAISHA, Tokyo (JP)

(72) Inventor: Hisashi Kataoka, Matsudo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/962,920

(22) Filed: Dec. 8, 2015

(65) Prior Publication Data

US 2016/0169364 A1 Jun. 16, 2016

(30) Foreign Application Priority Data

Dec. 11, 2014 (JP) ................................. 2014-251341
Sep. 1, 2015 (JP) ................................. 2015-171909

(51) Int. Cl.
*F16H 57/021* (2012.01)
*B41J 23/04* (2006.01)
(Continued)

(52) U.S. Cl.
CPC ............ *F16H 57/021* (2013.01); *B41J 23/02* (2013.01); *B41J 23/04* (2013.01); *B65H 3/0669* (2013.01); *F16H 57/022* (2013.01); *F16H 57/023* (2013.01); *G03G 15/6511* (2013.01); *B65H 2403/42* (2013.01); *B65H 2404/17* (2013.01);
(Continued)

(58) Field of Classification Search
CPC ....... B41J 23/02; B41J 23/04; B65H 2403/00; B65H 2403/40; B65H 2403/42; B65H 2403/50; B65H 2403/72; B65H 2403/722; B65H 2404/17; B65H 3/06; B65H 3/0669; B65H 2402/00; B65H 2402/50; B65H 2402/52; B65H 2402/521; B65H 2402/522; B65H 2402/5221; B65H 2402/60; B65H 2402/61; B65H 2402/62; F16H 2057/02034; F16H 2057/0216; F16H 2057/0222; F16H 2057/0224;
(Continued)

(56) References Cited

U.S. PATENT DOCUMENTS 6,969,058 B2 * 11/2005 Gaarder ............... B65H 3/0669
                                                     271/10.04
7,025,345 B2 *  4/2006 Frazier .................... B65H 3/06
                                                        271/109
(Continued)

FOREIGN PATENT DOCUMENTS

JP    H06-036340 U    5/1994
JP    2000259009 A    9/2000
(Continued)

*Primary Examiner* — Victor L MacArthur
*Assistant Examiner* — Joseph Brown
(74) *Attorney, Agent, or Firm* — Canon U.S.A., Inc. I.P. Division

(57) ABSTRACT

A drive transmission device includes a shaft supporting member attached to a drive frame. The shaft supporting member rotatably supports a driving shaft. The shaft supporting member includes two bearing surfaces for rotatably holding the driving shaft, where the two bearing surfaces are disposed so as to be on a straight line, and a boss portion having the center thereof located on the straight line for positioning the drive transmission device relative to the drive frame.

15 Claims, 11 Drawing Sheets

(51) Int. Cl.
*B65H 3/06* (2006.01)
*F16H 57/023* (2012.01)
*F16H 57/022* (2012.01)
*B41J 23/02* (2006.01)
*G03G 15/00* (2006.01)
*F16H 57/02* (2012.01)

(52) U.S. Cl.
CPC ............... *F16H 2057/0216* (2013.01); *F16H 2057/0224* (2013.01); *F16H 2057/02034* (2013.01)

(58) Field of Classification Search
CPC ......... F16H 2057/021; F16H 2057/022; F16H 57/023; G03G 15/6511
See application file for complete search history.

(56) References Cited

U.S. PATENT DOCUMENTS

| | | | | |
|---|---|---|---|---|
| 7,561,826 B2* | 7/2009 | Takigawa | ............. | G03G 15/757 399/111 |
| 8,944,428 B2* | 2/2015 | Piening | ................ | B65H 3/0684 271/121 |
| 9,145,275 B2* | 9/2015 | Ito | ........................ | B65H 3/0661 |
| 9,181,051 B2* | 11/2015 | Lee | ...................... | B65H 3/0684 |
| 9,205,680 B2* | 12/2015 | Mackey | ................ | B65H 3/0684 |
| 9,254,974 B2* | 2/2016 | Song | ................... | B65H 3/0669 |
| 9,309,066 B2* | 4/2016 | Yamamoto | ............... | B65H 5/06 |
| 2004/0087400 A1* | 5/2004 | Youn | ..................... | B41J 19/005 474/117 |
| 2011/0241282 A1* | 10/2011 | Nishinakama | ....... | B65H 3/0661 271/117 |
| 2012/0051788 A1 | 3/2012 | Tsuji | | |
| 2015/0321862 A1* | 11/2015 | Song | ................... | B65H 3/0669 271/117 |

FOREIGN PATENT DOCUMENTS

| | | |
|---|---|---|
| JP | 2007212806 A | 8/2007 |
| JP | 2010038950 A | 2/2010 |
| JP | 2012-029345 A | 2/2012 |
| JP | 2013-174326 A | 9/2013 |

* cited by examiner

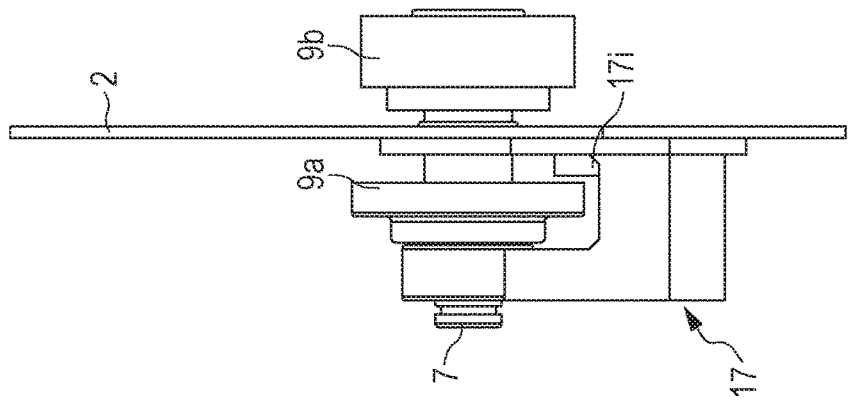
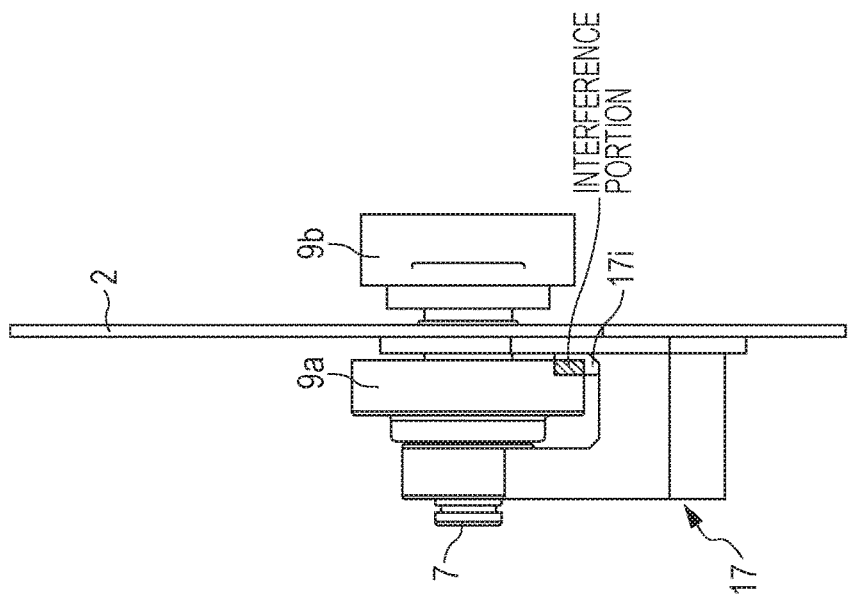
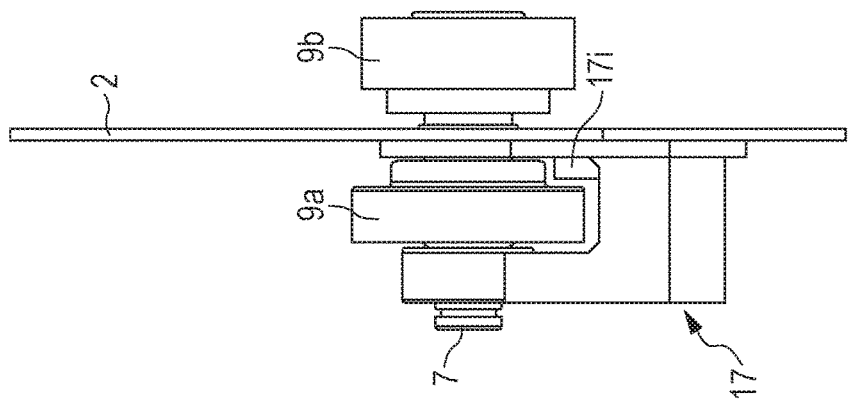

DRIVE TRANSMISSION DEVICE FOR TRANSMITTING ROTARY DRIVE

BACKGROUND OF THE INVENTION

Field of the Invention

The present invention relates to a drive transmission device for transmitting a rotary drive.

Description of the Related Art

In general, drive transmission devices for transmitting a rotary drive using a shaft and a gear fixed to the shaft have a configuration in which two points of the shaft are rotatably supported by bearings each supported by a support side panel (a frame). For such a rotary mechanism, it is important that the center of axis of the shaft for transmitting the rotation is maintained at the same position with a high degree of accuracy. For example, if the attached shaft is inclined, a gear fixed to the shaft may be in partial contact with a gear that is meshed therewith. Accordingly, abnormal wear may occur or abnormal sound may be generated.

To support the shaft at no inclination, Japanese Patent Laid-Open No. 2007-212806 describes a technique of forming a gap between the bearings and automatically aligning the center of axis using a planetary gear.

To prevent inclination of the rotary member attached to the driving shaft that transmits a rotation, a support configuration that prevents the inclination of the driving shaft is needed. If the center-of-axis aligning mechanism described in Japanese Patent Laid-Open No. 2007-212806 is employed, the following constituent elements, that is, at least three planetary gears, two bearings, and one cylindrical member are needed. To prevent the inclination of the driving shaft, the demand for a support structure formed from less number of constituent elements has increased.

SUMMARY OF THE INVENTION

Accordingly, the present invention provides a drive transmission device capable of preventing the inclination of the driving shaft using a small number of constituent elements.

According to an aspect of the present invention, a drive transmission device includes a driving shaft, a shaft supporting member configured to support the driving shaft rotatably, a member to be attached to which the shaft supporting member is attached, and a rotary member attached to the driving shaft and configured to transmit driving force, where the member to be attached includes a positioning hole configured to position the shaft supporting member. The shaft supporting member includes a first bearing portion with which a first bearing surface configured to support the driving shaft is provided, a second bearing portion with which a second bearing surface configured to support the driving shaft is provided, a connecting portion configured to connect the first bearing portion and the second bearing portion, a positioning portion engaged to the positioning hole for positioning the shaft supporting member with respect to the member to be attached. The first bearing portion, the second bearing portion, the connecting portion, and the positioning portion are integrally formed. A position of the first bearing portion and a position of the second bearing portion are different from each other in axial direction of the driving shaft, and a center of axis of the first bearing surface, a center of axis of the second bearing surface, and a center of the positioning portion are disposed on substantially the same straight line.

Further features of the present invention will become apparent from the following description of exemplary embodiments with reference to the attached drawings.

BRIEF DESCRIPTION OF THE DRAWINGS

FIGS. 10A to 10C illustrate correct and wrong directions in which the rotary member is mounted according to the third exemplary embodiment.

DESCRIPTION OF THE EMBODIMENTS

Figure 1:
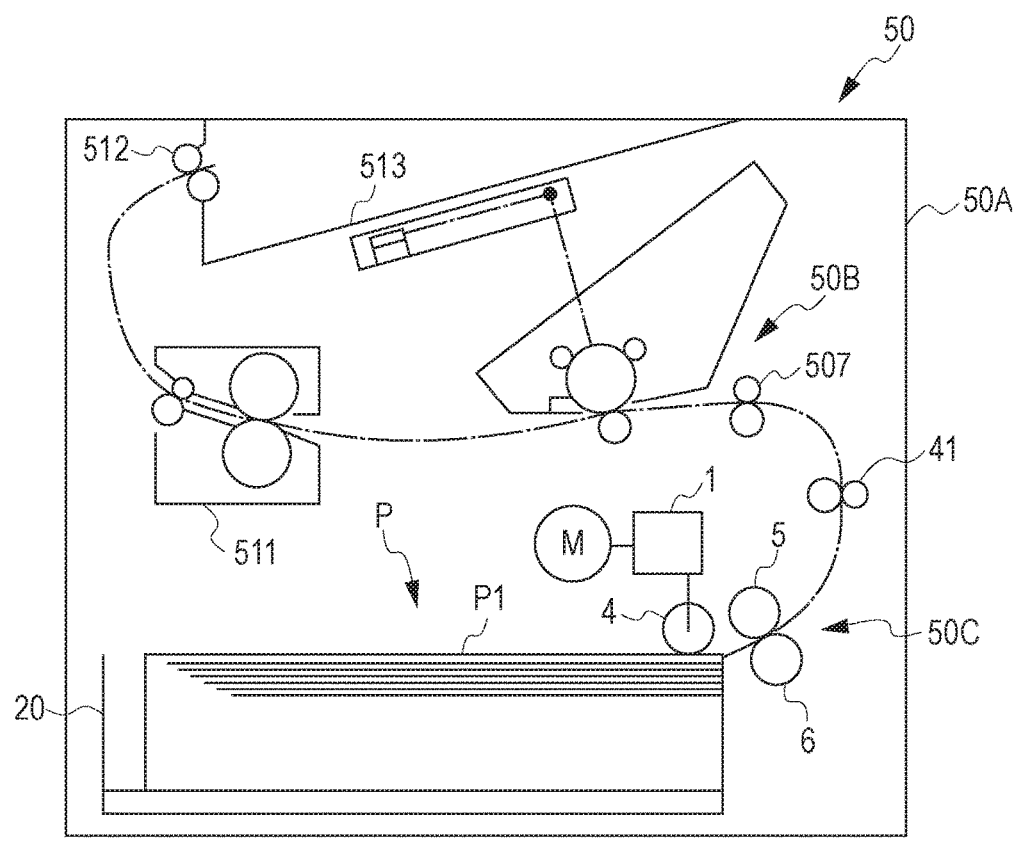
FIG. 1 is an overall view of an image forming apparatus according to first to third exemplary embodiments of the present invention.

An example of the basic configuration of an image forming apparatus including a drive transmission device according to an exemplary embodiment of the present invention is described first with reference to FIG. 1.

A printer 50, which is the image forming apparatus, is configured so as to include a drawable sheet cassette 20, which is a sheet container unit that can contain a sheet bundle P. The sheet bundle P contained in the sheet cassette 20 is fed to an image formation unit 50B by a sheet feeding unit 50C one sheet by one sheet. The sheet fed by the sheet feeding unit 50C is conveyed to a pair of conveying rollers 41.

A pair of alignment rollers (a pair of registration rollers) 507 is disposed downstream of the pair of conveying rollers 41 in the sheet conveyance direction. The sheet fed by the pair of conveying rollers 41 strikes a nip formed by the pair of alignment rollers that is stopped and, thus, a loop of the sheet is formed. If a loop of the sheet is formed, the entire leading edge is brought into contact with the pair of alignment rollers along the nip and, thus, the skew of the leading edge is corrected. After the skew of the leading edge of the sheet is corrected, the pair of alignment rollers 507 starts rotating. Thus, the sheet is conveyed to the image formation unit 50B.

The image formation unit 50B forms an image on the sheet by an electrophotographic technique. The image formation unit 50B transfers a toner image formed on an image bearing member onto the sheet using a transfer unit. In addition, the toner image is fixed on the sheet by a fixing unit 511. Note that according to the present exemplary embodiment, the image formation unit is not limited to that based on the electrophotographic technique. The image formation unit 50B may employ another image forming technique, such as an inkjet technique.

The sheet having an image formed thereon by the image formation unit 50B is output onto an output tray 513 by a paper output roller 512.

The sheet feeding unit 50C includes a separation portion formed from a pickup roller 4 serving as a feeder roller, a feed roller 5 serving as a conveyance roller, and a retard roller 6 serving as a separation roller. The pickup roller 4 is brought into pressure contact with a sheet P1 which is the uppermost sheet of the sheet bundle P stacked on a tray of the sheet cassette 20 and, thereafter, rotates. Thus, the sheet P1 is fed. The feed roller 5 and the retard roller 6 separates the sheets fed by the pickup roller 4 one sheet by one sheet and conveys the separated sheet to the pair of conveying rollers 41. A drive motor M inputs a rotational force into the pickup roller 4 via a drive transmission device 1 (described in more detail below) to rotate the pickup roller 4. By attaching a drive frame 2 illustrated in FIGS. 2A and 2B to a main frame, the drive transmission device 1 is fixed to the image forming apparatus.

First Exemplary Embodiment

The drive transmission device 1 according to the first exemplary embodiment is described next with reference to FIGS. 2A and 2B and FIG. 3.

According to the first exemplary embodiment, the drive transmission device 1 includes a caulking shaft 3, an idler gear 13, a driving shaft 7, a shaft supporting member 8, and drive gears 9a and 9b serving as the rotary member. In addition, a cam and a pulley may be used to transmit a drive. As illustrated in FIG. 3, a caulking hole 2a is formed in the drive frame 2 serving as a plate-like member to be attached. The member to be attached allows the caulking shaft 3 and the shaft supporting member 8 to be attached thereto. The caulking shaft 3 is inserted into the caulking hole 2a and, thereafter, is caulked. In this manner, the caulking shaft 3 is positioned and fixed to a flat portion of the drive frame 2 so as to be perpendicular to the flat portion. The idler gear 13 has a through-hole at the center thereof. The through-hole is inserted into the caulking shaft 3 so that the idler gear 13 is rotatably supported by the caulking shaft 3.

In addition, the shaft supporting member 8 is fixed to the drive frame 2. The shaft supporting member 8 serves as a shaft supporting portion that supports the driving shaft 7 which transmits a drive. As illustrated in FIG. 3, the plate-like drive frame 2 has a screw hole 2c and a positioning hole 2b formed therein. The screw hole 2c is used to attach the shaft supporting member 8 to the drive frame 2 using a screw 15. The positioning hole 2b is used to position the shaft supporting member 8 in place. Note that the screw hole 2c has a thread groove on the inner peripheral surface thereof. In addition, the drive frame 2 has a flat surface portion to be attached 2d to which the shaft supporting member 8 is to be attached.

Figure 2A:
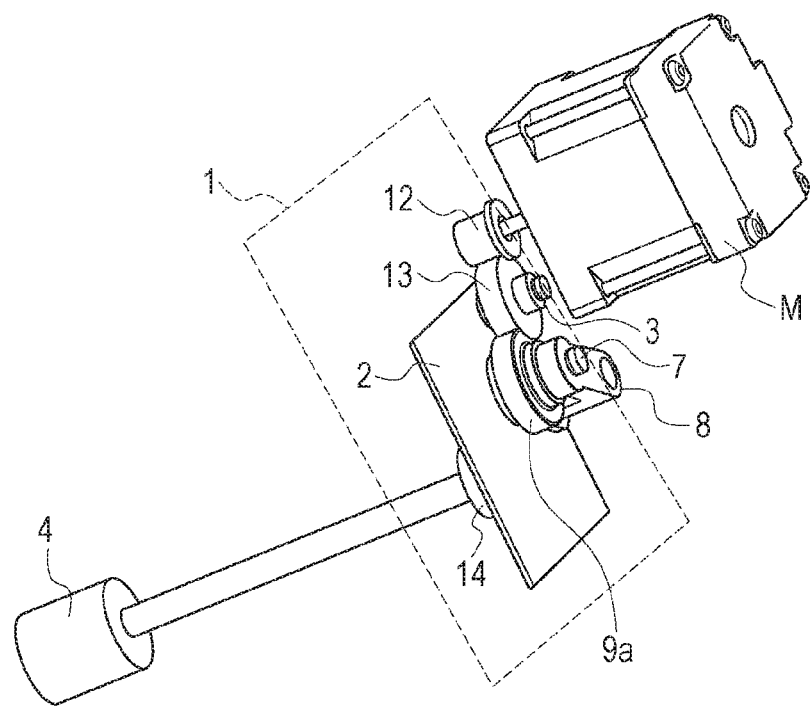
FIGS. 2A and 2B illustrate the placement of a drive transmission device and parts in the vicinity according to the first exemplary embodiment.
Figure 2B:
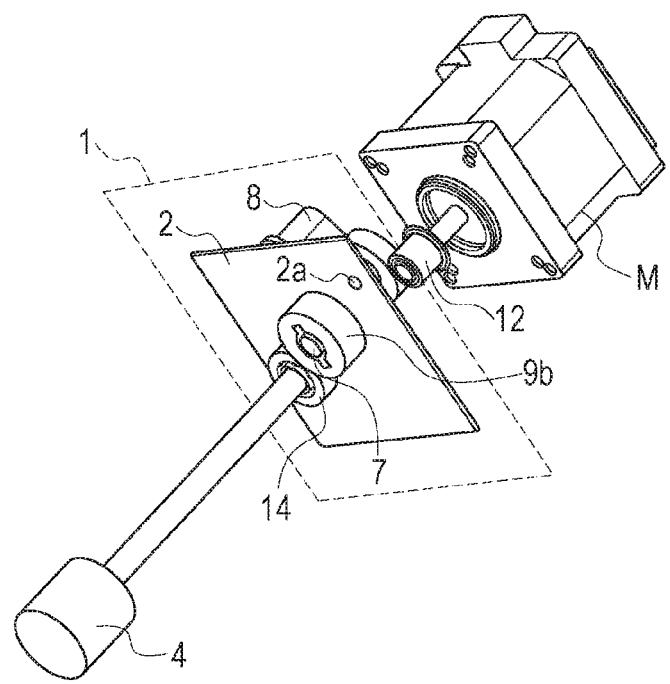
Figure 3:
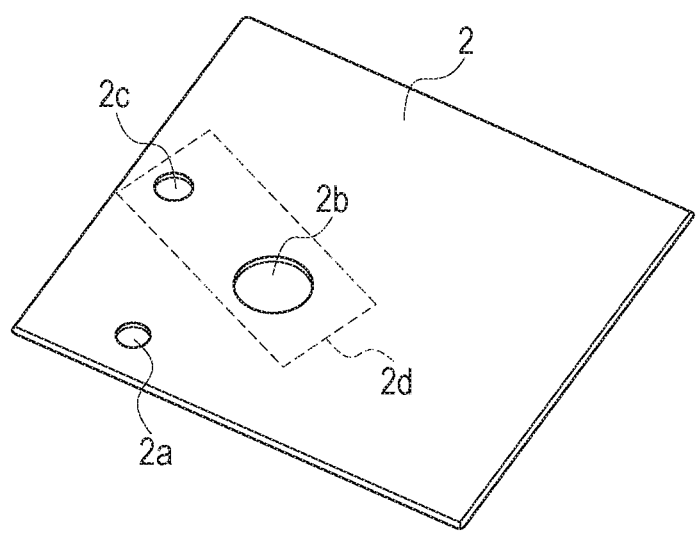
FIG. 3 is a perspective view illustrating the shape of a drive frame that allows the drive transmission device attached thereto.

As illustrated in FIGS. 2A and 2B, the shaft of the drive motor M has a pinion gear 12 fixed thereto. The idler gear 13 of the drive transmission device 1 is meshed with the pinion gear 12. In addition, the drive gear 9a attached to the driving shaft 7 is meshed with the idler gear 13. Furthermore, the drive input gear 14 is fixed to a support shaft of the pickup roller 4. The drive input gear 14 is meshed with the drive gear 9b. In this manner, the driving shaft 7 has the drive gear 9a and the drive gear 9b on either side of the drive frame 2. Such a configuration transmits the rotation of the drive motor M to the pickup roller 4 via the pinion gear 12, the idler gear 13, the drive gear 9a, the drive gear 9b, the drive input gear 14 and the driving shaft 7.

As illustrated in FIGS. 4A to 4D, the shaft supporting member 8 is integrally formed from a bearing portion 8a serving as a first bearing portion, a bearing portion 8b serving as a second bearing portion, and a connecting portion 8j. The bearing portions 8a and 8b have a bearing surface 8c serving as a first bearing surface and a bearing surface 8d serving as a second bearing surface formed thereon, respectively. The bearing surfaces 8c and 8d rotatably support the driving shaft 7. A fastening surface 8g and a fastening hole 8f are used to fix the shaft supporting member 8 to the drive frame 2. The bearing surfaces 8c and 8d are formed so that the centers of axes thereof are located on the same straight line C. In addition, the bearing portion 8b has a boss portion 8e serving as a positioning portion for positioning the shaft supporting member 8 relative to the drive frame 2. The boss portion 8e is cylindrical in shape. The inner peripheral surface and the outer peripheral surface of the boss portion 8e are disposed so as to be coaxial (refer to FIG. 4A). The center of axis (the center) of the outer peripheral surface of the boss portion 8e is disposed on the straight line C that is the same as the center of axis of each of the bearing surfaces 8c and 8d. According to the present exemplary embodiment, the inner side surface of the boss portion 8e forms a round hole having a diameter that is the same as that of the bearing surface 8c and functioning as a bearing. However, any shape that forms a through hole having a hole size that is larger than the outside diameter of the driving shaft 7 may be employed. Note that by causing the inner peripheral surface of the boss portion 8e to also serve as the bearing surface 8d as in the present exemplary embodiment, the drive frame 2 can directly support the radial load imposed on the bearing surface 8d. In addition, the area of the bearing surface 8d can be increased without increasing a space dedicated to the shaft supporting member 8.

Note that the diameter of the bearing surface 8c need not be the same as that of the bearing surface 8d. For example, if the driving shaft 7 is a stepped shaft having different diameters along the thrust direction, the diameters of the bearing surfaces 8c and 8d differ from each other in accordance with the difference between the two diameters of the driving shaft 7.

The outer surface of the bearing portion 8b has an attaching surface 8h disposed therein. The attaching surface 8h is in contact with a surface to be attached 2d of the drive frame 2 (refer to FIG. 3) and is perpendicular to the above-described same straight line C. This configuration keeps the straight line C on which the center of axis of the bearing surfaces 8c and 8d and the center of axis of the boss portion 8e extend to be perpendicular to the flat portion of the plate-like drive frame 2 when the shaft supporting member 8 is fixed to the drive frame 2.

Figure 5:
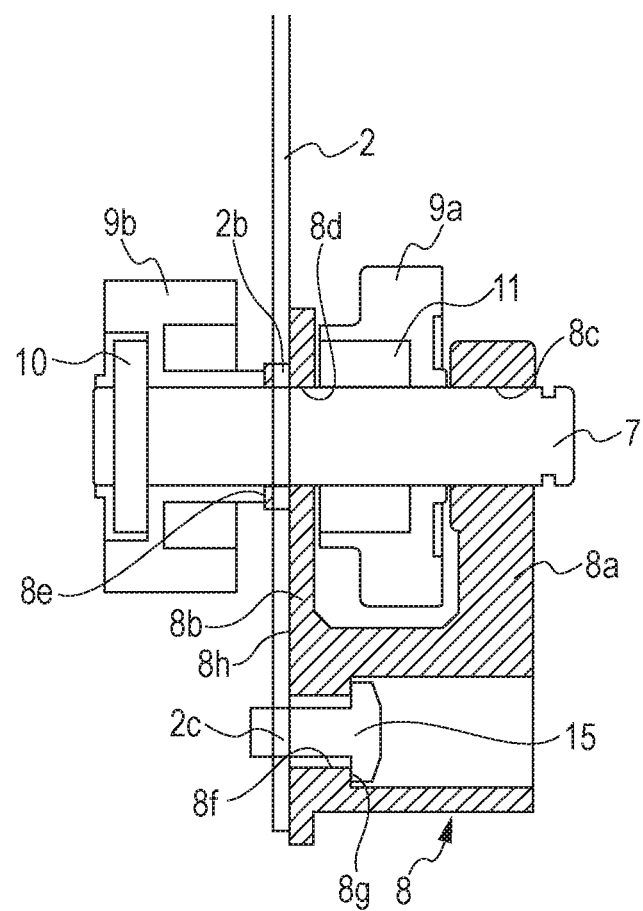
FIG. 5 illustrates the shaft supporting member fixed to the drive frame according to the first exemplary embodiment.

FIG. 5 illustrates the shaft supporting member 8 fixed to the drive frame 2.

As illustrated in FIG. 5, the outer peripheral surface of the boss portion 8e of the shaft supporting member 8 is fitted into the positioning hole 2b of the drive frame 2 and, thus, the shaft supporting member 8 is positioned in place with respect to the drive frame 2. After the shaft supporting member 8 is positioned in place, the screw 15 is completely inserted into the fastening hole 8f and is screwed into the screw hole 2c. Thus, the fastening surface 8g is fixed to the drive frame 2 by the screw 15. When the fastening surface 8g is fixed to the drive frame 2, the attaching surface 8h of the shaft supporting member 8 is in contact with a flat surface portion of the drive frame 2 without any gap therebetween.

As described above, when the shaft supporting member 8 is fixed to the drive frame 2, the driving shaft 7 is perpendicular to the flat surface of the drive frame 2. In addition, the caulking shaft 3 that rotatably supports the idler gear 13 is perpendicular to the flat surface of the drive frame 2. That is, when the shaft supporting member 8 is attached to the drive frame 2, the driving shaft 7 is parallel to the caulking shaft 3 (refer to FIG. 2A).

Figure 4A:
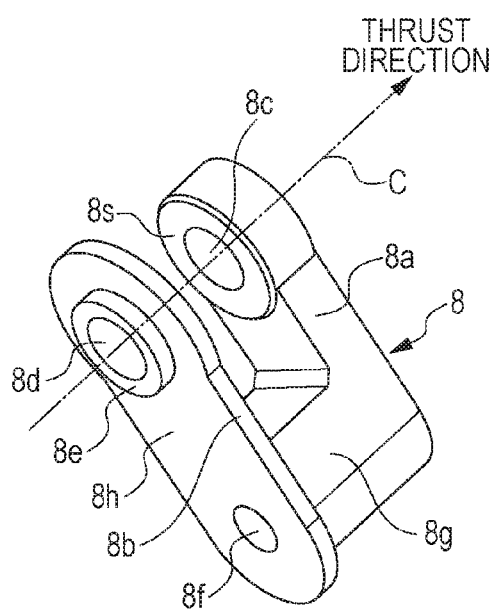
FIGS. 4A to 4D illustrate the shape of a shaft supporting member according to the first exemplary embodiment.
Figure 4B:
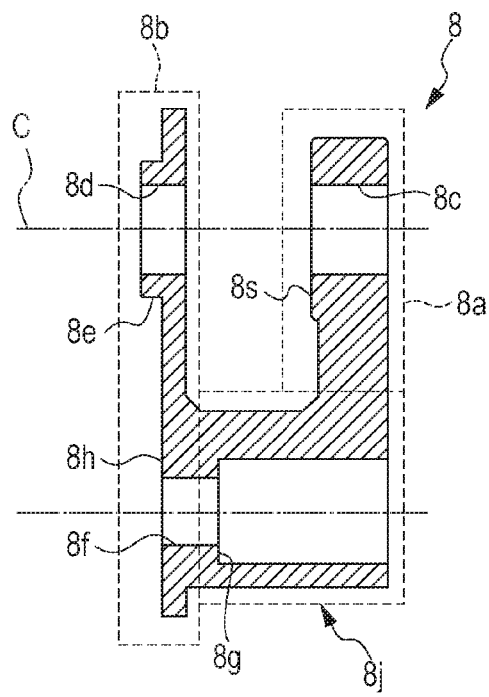
Figure 4C:
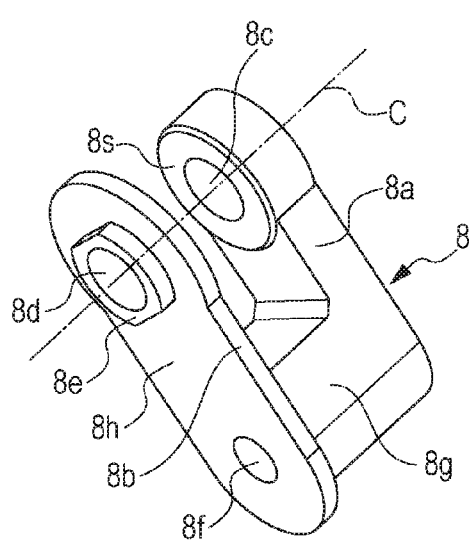

Note that the shape of the positioning portion is not limited to a cylindrical shape, such as the shape of the boss portion 8e illustrated in FIG. 4A. The shape of the positioning portion may be any shape partially including a circular arc shape having the center located on the straight line C and that protrudes from the attaching surface 8h. For example, as illustrated in FIG. 4C, the positioning portion may be in the shape of two arcs and two chords.

The bearing portions 8a and 8b of the shaft supporting member 8 including the bearing surfaces 8c and 8d, respectively, are integrally formed using the same material. Note that since the bearing surfaces 8c and 8d slide on the driving shaft 7, it is desirable that the material of the shaft supporting member 8 be a sintered metal including oil or an industrial-level plastic, such as conducting Polyoxymethylen (POM), each having excellent electrical conductivity and slidability. The excellent electrical conductivity is desirable because the driving shaft 7 electrically charged due to sliding between the driving shaft 7 and each of the bearing portions 8a and 8b may have an adverse effect on electric parts in the vicinity. In addition, a surface 8s of the bearing surface 8c that slides on the drive gear 9a is formed as a stepped surface. This is because such a shape facilitates the management of the dimensions of the surface 8s in order to accurately position the drive gear 9a in the axial direction.

According to the present exemplary embodiment, the shaft supporting member 8 is integrally formed from the bearing portions 8a and 8b, the fastening surface 8g, the boss portion 8e, and a connecting portion 8j. However, the portions may be formed from different materials. For example, the bearing portions 8a and 8b may be formed of a material having an excellent slidability that is suitable for the bearing, and the connecting portion 8j may be may be formed of a material having an excellent rigidity. In addition, the shaft supporting member 8 may be integrally formed using any technique that can integrally form a drive support member, such as integral molding, cutting, or molding by a 3D printer.

Furthermore, as illustrated in FIG. 5, a pin hole is formed in the driving shaft 7 so as to extend in a direction that is perpendicular to the direction of the center of axis. By engaging a parallel pin 10 inserted into the pin hole with a groove portion of the drive gear 9b, the drive gear 9b is fixed to the driving shaft 7. In contrast, the drive gear 9a has an existing one-way clutch 11 incorporated into a gear. The gear rotates in unison with the one-way clutch 11. In addition, the one-way clutch 11 is engaged with the driving shaft 7. The drive gear 9a is disposed so as to be sandwiched by the bearing portions 8a and 8b. Thus, the movement in the thrust direction (the axial direction of the driving shaft) illustrated in FIG. 4A is regulated. By fitting a removal protection member, such as a C ring, into an end of the driving shaft 7 adjacent to the drive gear 9a, movement of the driving shaft 7 in the direction of the center of axis is regulated.

The operation to transmit the rotation of the drive motor M to the pickup roller 4 is described below (refer to FIGS. 2A and 2B). The pinion gear 12 rotates in accordance with the rotation of the drive motor M, and the idler gear 13 meshed with the pinion gear 12 rotates about the caulking shaft 3. Then, the drive gear 9a meshed with the idler gear 13 rotates. At that time, since the one-way clutch 11 is disposed so as to rotate in a direction in which a drive is transmitted, the driving force is transmitted from the drive gear 9a to the driving shaft 7. Thus, the driving shaft 7 is rotated. If the driving shaft 7 is rotated, the drive gear 9b is rotated via the parallel pin 10 and, thus, the driving force is transmitted from the drive input gear 14 to the pickup roller 4. Note that when the drive motor M is stopped and if a sheet provides a drag on rotation of the pickup roller 4, the rotation of the pickup roller 4 is not transmitted to the drive motor M since the one-way clutch 11 does not transmit the rotation. As described above, according to the present exemplary embodiment, the one-way clutch 11 is used to prevent transmission of the rotational force from the pickup roller 4 to the drive motor M. However, the configuration is not limited thereto. The one-way clutch may be disposed to switch whether a drive is transmitted in accordance with the rotational direction of the drive motor M.

Note that to smoothly transmit the driving force (the rotation of the drive motor M) from the idler gear 13 to the drive gear 9a, it is important to accurately support the center of axis of the driving shaft 7 relative to the drive frame 2. For example, if the driving shaft 7 is inclined from the drive frame 2, the alignment between the caulking shaft 3 and the driving shaft 7 decreases and, thus, partial contact between the gears occurs. Consequently, abnormal sound may be generated, or abnormal wear of the teeth of the gear may occur. Note that the alignment between the caulking shaft 3 and the driving shaft 7 is influenced by the distance between two points at which the shaft is supported. If the degrees of the positional deviation of the bearing and the support side panel are substantially the same, the inclination of the shaft increases with decreasing distance between the two points at which the shaft is supported.

In recent years, the demand for downsizing the device has been increasing. To save a space, the driving shaft that is relatively short may be employed. At that time, if the driving shaft is short, the distance between the two points at which the shaft is supported is also short. Thus, the driving shaft is easily inclined.

The advantage of the present exemplary embodiment in terms of the inclination of the driving shaft 7 relative to the drive frame 2 is described next with reference to FIGS. 6A and 6B. For ease of understanding, FIGS. 6A and 6B illustrate exaggerated clearance for fitting of each of the parts and exaggerated inclination of the shaft.

Figure 6A:
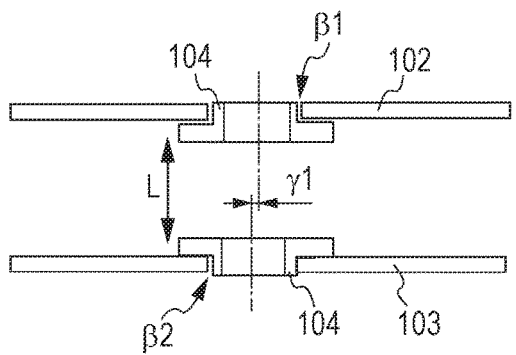
FIGS. 6A to 6D illustrate the advantage of a shaft supporting technique of the present invention over an existing shaft supporting technique.
Figure 6C:
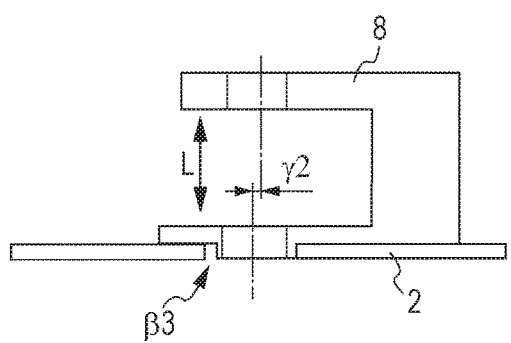
Figure 6B:
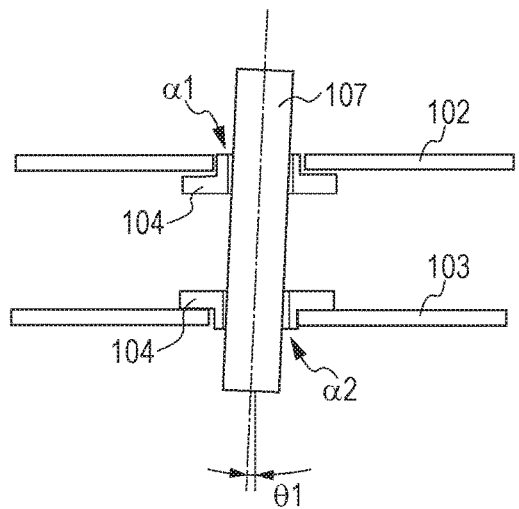

FIGS. 6A and 6B illustrate a generally employed existing structure. Drive support plates 102 and 103 are disposed at either end of a driving shaft 107. By attaching the bearings 104 and 104 to the drive support plates 102 and 103, respectively, the driving shaft 107 is supported.

In FIGS. 6A and 6B, let L be the distance between two points at which the driving shaft is supported (the distance between the bearings 104 and 104). In addition, let $\alpha 1$ and $\alpha 2$ be clearances for fitting between the driving shaft 107 and the bearings 104 and 104, respectively. Let $\beta 1$ be a clearance for fitting between the bearing 104 and the drive support plate 102, and let $\beta 2$ be a clearance for fitting between the bearing 104 and the drive support plate 103. Let γ1 be the positional deviation of the drive support plates 102 and 103. Then, the largest angle θ1 of inclination of the shaft can be expressed as follows:

$$\theta 1 = \arctan\{(\alpha 1 + \alpha 2 + \beta 1 + \beta 2 + \gamma 1)/L\} \quad (1).$$

Since L cannot exceed the length of the shaft, L decreases with decreasing length of the shaft. That is, θ1 increases with decreasing length of the shaft. In such a configuration, if the drive transmission device is downsized and L is shorter than that of existing drive transmission devices, the inclination θ1 of the shaft increases unless the values of α1, β1, and γ1 are decreased. Note that the values of α1, α2, β1, β2, and γ1 depends on the accuracy of parts and assembling. To decrease these values, the accuracy needs to be improved. The part accuracy and the assembling accuracy can be increased by carefully selecting the parts and employing a high-performance working machine. However, in such a case, the manufacturing cost increases.

Accordingly, if the size of a drive transmission device having an existing configuration is reduced, an additional cost is required to maintain the positional accuracy of the driving shaft.

Figure 6D:
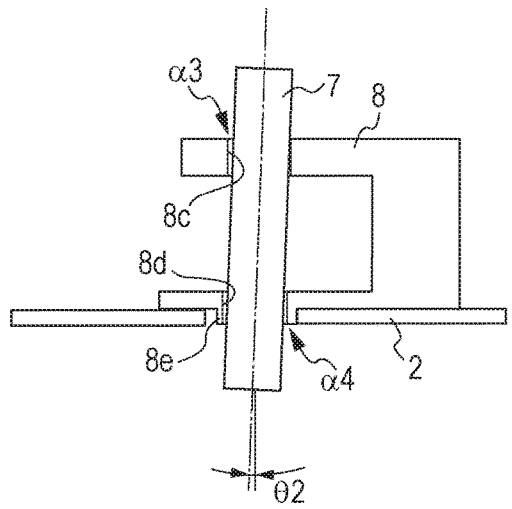

The support structure for the driving shaft 7 according to the present exemplary embodiment is illustrated in FIGS. 6C and 6D. As illustrated in FIGS. 6C and 6D, let α3 and α4 be clearance for fitting of the bearing surfaces 8c and 8d and the driving shaft 7, respectively. Let β3 be the clearance for fitting between the boss portion 8e of the shaft supporting member 8 and the positioning hole 2b of the drive frame. In addition, let γ2 be the positional deviation of the bearing surfaces 8c and 8d. Then, the largest angle θ2 of inclination of the shaft can be expressed as follows:

$$\theta 2 = \arctan\{(\alpha 3 + \alpha 4 + \gamma 2)/L\} \quad (2).$$

As can be seen from comparison of equations (1) and (2), θ2 does not contain the terms corresponding to β1 and β2 and, thus, the clearance between the shaft supporting member 8 and the drive frame 2 does not have an impact on the inclination of the driving shaft 7. In addition, γ2 represents the positional deviation between two portions of the same part. In contrast, γ1 represents the positional deviation between two parts. Accordingly, the part accuracy and the assembly accuracy have an additional influence and, thus, γ1 is greater than γ2.

Consequently, if the conditions, such as L that depends on the size of the drive transmission device and α1 and α2 that depend on the part accuracy are the same, θ2 is smaller than θ1 and, thus, the inclination of the driving shaft can be reduced from that of existing drive transmission devices. Such an advantage is particularly worthwhile when L needs to be reduced due to reduction of the space of the drive transmission device. That is, the inclination of the shaft that increases with decreasing L can be reduced without the cost required for increasing the part accuracy. In addition, the parts required for supporting the driving shaft are only a drive frame and a shaft supporting member. That is, the number of parts required for supporting the driving shaft is smaller than that in existing configuration. Such an advantage allows the manufacturing cost to be reduced more than that of existing configurations.

Note that to accurately maintain the position of the driving shaft 7 relative to the drive frame 2 in place, it is important to minimize the positional deviation between the center of the outer peripheral surface of the boss portion 8e and the center of axis of the bearing surfaces 8c and 8d. This is because the center of axis of the bearing surfaces 8c and 8d is positioned by the drive frame via the outer peripheral surface of the boss portion 8e. The advantage attained by positioning the center of the outer peripheral surface of the boss portion 8e on the straight line C is described below.

Figure 4D:
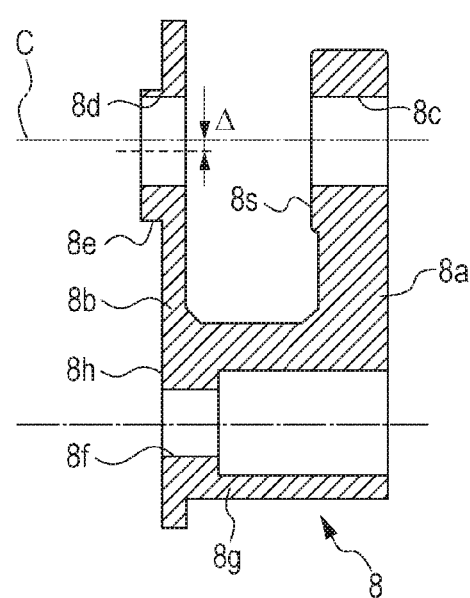

Assume that as illustrated in FIG. 4D, the center of the outer peripheral surface of the boss portion 8e is positioned at a location that is not on the straight line C. At that time, let Δ be a design deviation between the center of the outer peripheral surface of the boss portion 8e and the straight line C. To accurately determine the position of the straight line C relative to the positioning hole 2b, the direction of Δ needs to be strictly controlled in addition to the value of Δ. If the number of parts to be strictly controlled increases, the manufacturing cost of the parts increases. In addition, if the shaft supporting member is integrally molded using resin, a non-uniform thickness from the outer peripheral surface of the boss to the bearing surface causes a problem. That is, since the shrinkage of resin varies depending on the thickness of the resin, distortion occurs in a portion having a non-uniform thickness after molding. If distortion occurs, the value of Δ and the direction of Δ varies and, thus, the bearing surface cannot be accurately positioned. By, as in the present exemplary embodiment, positioning the center of the outer peripheral surface of the boss portion 8e on the straight line C, the above-described issues can be addressed.

The positional deviation between the center of the outer peripheral surface of the boss portion 8e and the center of axis of the bearing surfaces 8c and 8d needs to be within such a range that the idler gear 13 is smoothly engaged with the drive gear 9a and the drive gear 9b is smoothly engaged with the drive input gear 14 without tooth jumping of the gear and contact between the top land of one gear and the bottom land of the mating gear. The range cannot be fixed for all cases. The range is determined in accordance with the size of the gear. More specifically, in the case of, for example, a spur gear having a module of 1.0 and a diameter of about 10 to 50 mm, it is desirable that the distance between the centers of axes have an error within ±0.2 mm with respect to the design value. In addition, since the positional deviation of the hole of the drive frame has some impact, it is desirable that the positional deviation between the center of the outer peripheral surface of the boss portion 8e and the center of axis of the bearing surfaces 8c and 8d be within ±0.1 to ±0.2 mm. The advantage of the bearing surface and the boss portion 8e which are integrally formed according to the present exemplary embodiment is described below. If, for example, the boss portion 8e is a part separated from the bearing portion 8b, the two parts are assembled with each other and are used. At that time, the positional deviation between the outer peripheral surface of the boss portion 8e and the bearing surface 8d occurs in accordance with the accuracy of assembling the parts (the boss portion 8e and the bearing portion 8b). Similarly, if the bearing portions 8a and 8b are separate parts, the position of the axis line of the bearing surfaces 8c and 8d is deviated in accordance with the accuracy of assembling the parts.

In contrast, if the bearing portions 8a and 8b and the boss portion 8e are integrally formed, the positional deviation caused by the accuracy of assembling can be eliminated. In addition, the variation of the dimensions of one part can be easily set to about 0.1 mm. Accordingly, by integrally forming the bearing portions 8a and 8b and the boss portion 8e, the desired accuracy can be obtained while minimizing the manufacturing cost.

As described above, according to the present exemplary embodiment, the shaft supporting member is integrally formed from the two bearing surfaces, the positioning portion, and the connecting portion. In addition, the center of axis of the two bearing surfaces and the center of the positioning portion are disposed on the same straight line, and the shaft supporting member is attached to a member to be attached. As a result, the shaft can be rotatably supported by a single shaft supporting member, and inclination of the shaft can be prevented.

While the present exemplary embodiment has been described with reference to a gear serving as a rotary member rotated by the driving shaft, any rotary member, such as a cam or a roller, can be employed. In addition, while the present exemplary embodiment has been described with reference to the drive transmission device that transmits a drive to the pickup roller 4, the drive may be transmitted to the conveyance roller for conveying a sheet. In addition to the conveyance roller, the drive transmission device may be applied to any configuration that transmits a rotary drive to the rotary member using a shaft.

Second Exemplary Embodiment

A second exemplary embodiment is described below with reference to FIGS. 7A and 7B. According to the present exemplary embodiment, only the shape of a shaft supporting member differs from that in the first exemplary embodiment. Accordingly, the difference in only the shapes of the portions from those of the first exemplary embodiment are described in detail below.

Figure 7A:
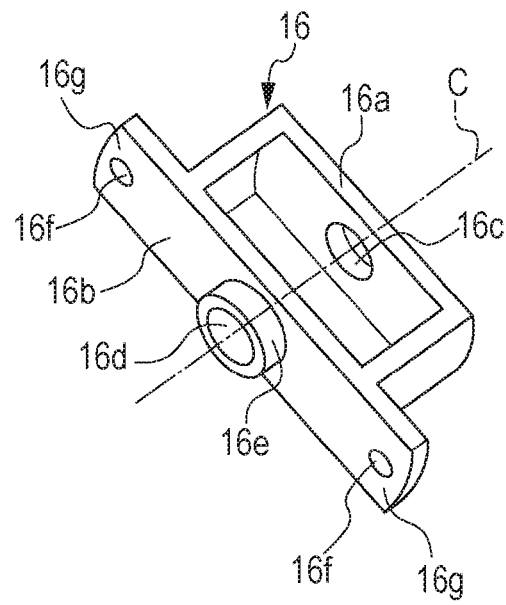
FIGS. 7A and 7B illustrate the shape of a shaft supporting member according to a second exemplary embodiment.
Figure 7B:
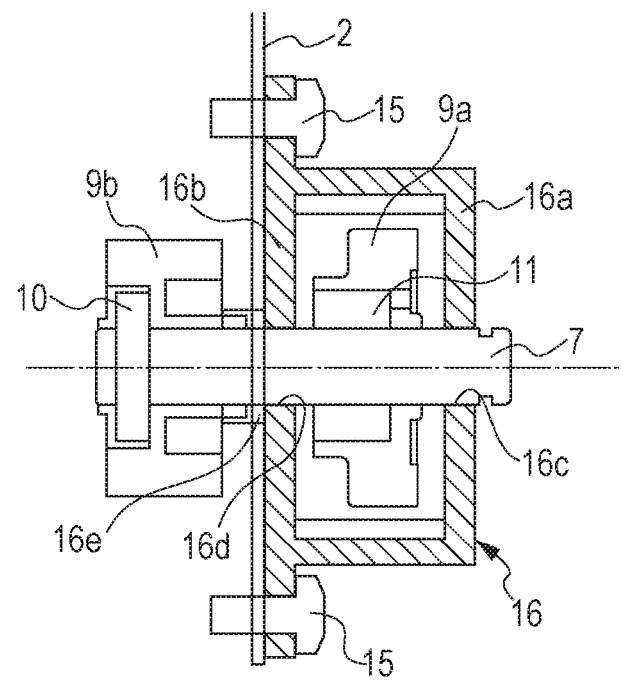

As illustrated in FIGS. 7A and 7B, like the first exemplary embodiment, a shaft supporting member 16 according to the second exemplary embodiment is integrally formed from bearing portions 16a and 16b and a positioning portion 16e. In addition, the shaft supporting member 16 includes a fastening portion 16g having a fastening hole 16f formed therein. Furthermore, like the first exemplary embodiment, the center of the outer peripheral surface of the positioning portion 16e is disposed on a straight line C that is the same as the center of axis of each of bearing surfaces 16c and 16d.

Note that in the first exemplary embodiment, the bearing portion 8a of the shaft supporting member 8 is supported in a cantilever fashion. In contrast, according to the second exemplary embodiment, the bearing portion 16a is supported at both ends thereof (a both-ends-supported beam structure). By supporting the bearing portion 16a at both ends thereof, the rigidity of the bearing portion 16a in a direction in which the driving shaft 7 is inclined can be increased.

The high rigidity can reduce the deformation of the shaft supporting member 8. However, the occupied space slightly increases from that of the first exemplary embodiment. Accordingly, the connection form of the bearing portions 8a and 8b can be determined in accordance with the torque transmitted by the driving shaft 7 and the available space.

Note that the effect of the present exemplary embodiment is resulted from the centers of axes of a plurality of bearings disposed on the same straight line in a single part. Accordingly, the shape of the shaft supporting member is not limited to those of the first exemplary embodiment and the second exemplary embodiment. For example, three or more bearing surfaces can be provided. Note that at that time, it is required that the centers of axes of the bearing surfaces be disposed on the same straight line. In addition, it is desirable that the shaft supporting member be reliably fixed to the drive frame 2 by changing the number of positions at which the shaft supporting member is fastened by the screws 15 in accordance with the shape and size of the shaft supporting member. For example, according to the second exemplary embodiment, since the size of the shaft supporting member is larger than in the first exemplary embodiment, the number of positions at which the shaft supporting member is fastened is increased to two. In this manner, the shaft supporting member is reliably fixed.

Third Exemplary Embodiment

The third exemplary embodiment is described below. In the configuration according to the first exemplary embodiment, the drive gear 9a that rotates in unison with the one-way clutch is disposed between the bearing portions 8a and 8b (refer to FIG. 5). In this configuration, if the one-way clutch is mounted on the shaft in the opposite direction, the direction in which a drive is transmitted is reversed. Accordingly, if the one-way clutch is mounted in a wrong direction, a drive cannot be transmitted. To prevent such a problem, according to the present exemplary embodiment, a structure that prevents mis-mounting of the one-way clutch in terms of the mounting direction is additionally provided to the structure of the first exemplary embodiment. Since the structures other than the structure that prevents mis-mounting of the one-way clutch is the same as those of the first exemplary embodiment, description of the structures is not repeated.

Figure 8A:
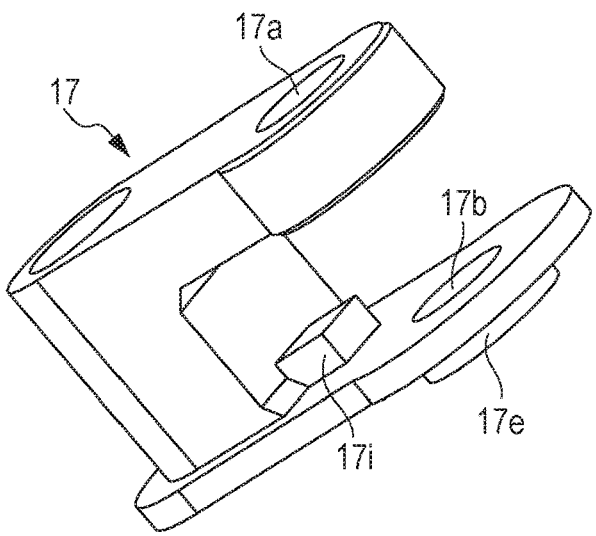
FIGS. 8A and 8B illustrate the shape of a shaft supporting member according to a third exemplary embodiment.
Figure 8B:
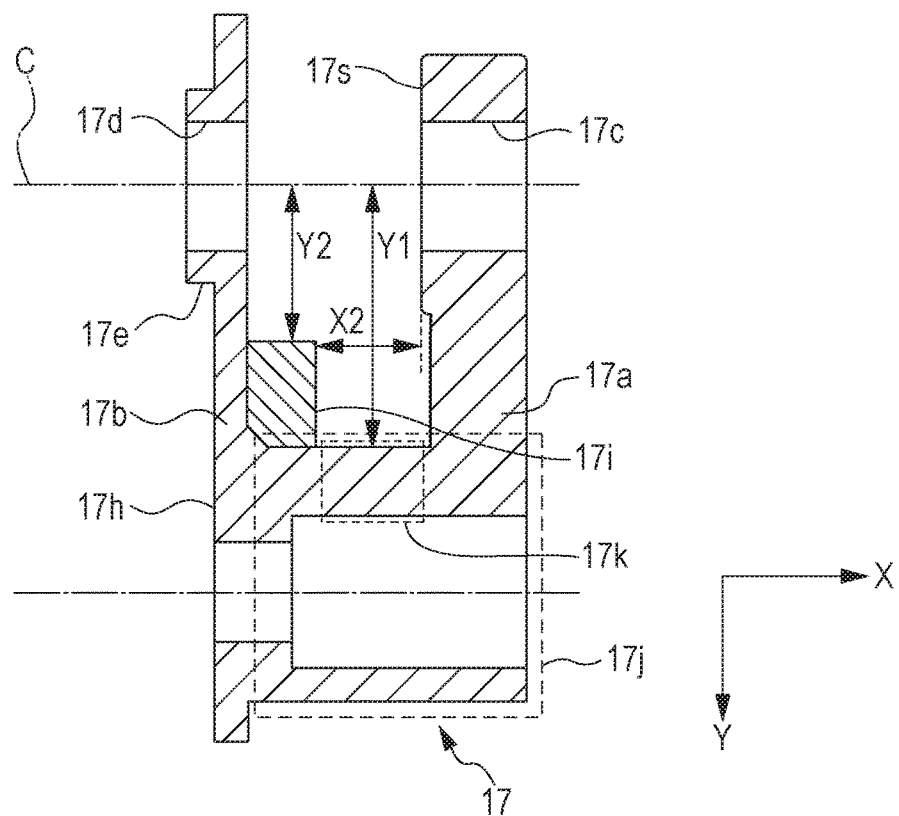

The shape of a shaft supporting member 17 according to the third exemplary embodiment is described first with reference to FIGS. 8A and 8B. Note that the axes of coordinate are X and Y axes illustrated in FIG. 8B. In FIG. 8B, the X direction is coincident with the direction of the straight line C (the thrust direction).

Although a bearing portion 17a is spatially separated from a bearing portion 17b in the direction of the straight line C, the bearing portion 17a is integrated with the bearing portion 17b since the bearing portions 17a and 17b are supported by a connecting portion 17j. The bearing portion 17a has a contact surface 17s that is in contact with the drive gear 9a.

In addition, the connecting portion 17j has a protrusion 17i serving as a second portion. As illustrated in FIG. 8B, the shortest distance Y1 between the straight line C and a first portion 17k is longer than the shortest distance Y2 between the straight line C and the protrusion 17i.

The drive gear 9a disposed between the bearing portions 17a and 17b has the one-way clutch 11 incorporated thereinto. The drive gear 9a and the one-way clutch 11 rotate together (refer to FIG. 9). If the driving shaft 7 is inserted in a wrong direction with the drive gear 9a disposed between the bearing portions 17a and 17b, the one-way clutch 11 is also attached in a wrong direction. Accordingly, by preventing the drive gear 9a from being attached to the driving shaft 7 in a wrong direction, the one-way clutch 11 can be prevented from being attached in a wrong direction. A structure that prevents the drive gear 9a from being attached in a wrong direction is described below.

Figure 9:
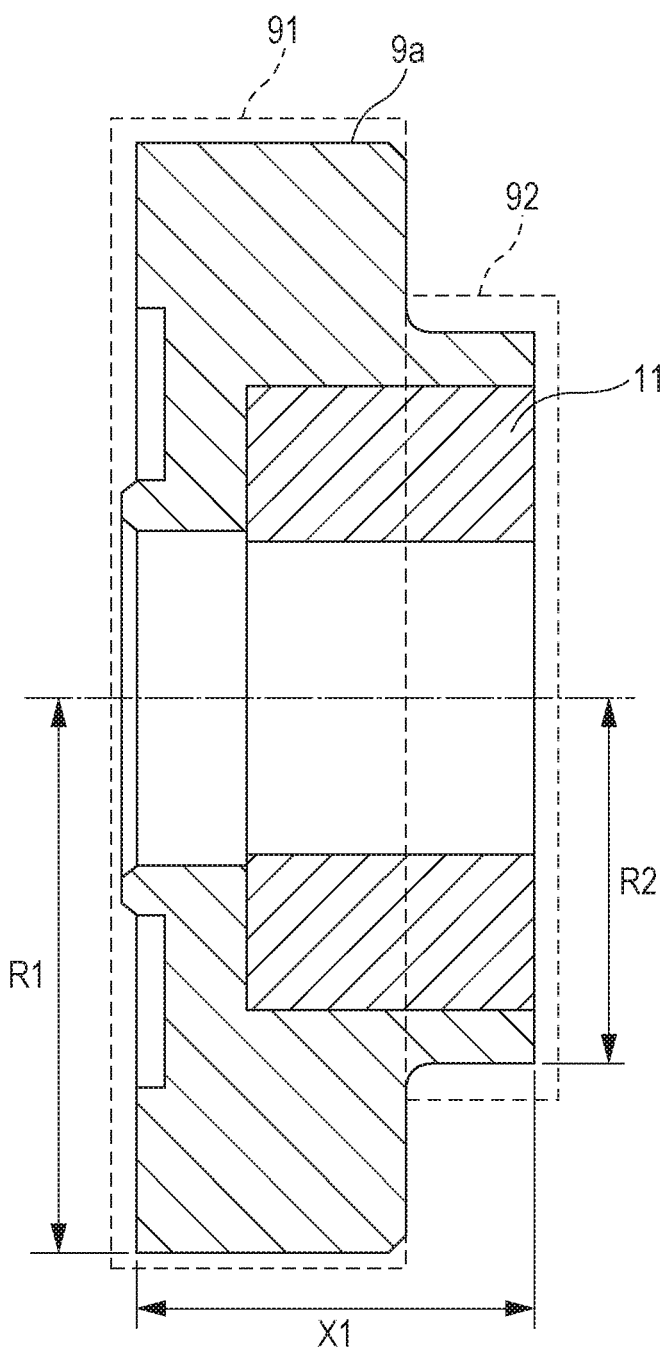
FIG. 9 is a cross-sectional view of the shape of a rotary member according to the third exemplary embodiment.

As illustrated in FIG. 9, the drive gear 9a includes a first rotary portion 91 and a second rotary portion 92. The radii of the first rotary portion 91 and the second rotary portion 92 are R1 and R2, respectively. Note that the width of the drive gear 9a is X1.

FIG. 10A illustrates the drive gear 9a correctly mounted on the driving shaft 7, and FIG. 10B illustrates the drive gear 9a mounted on the driving shaft 7 in a wrong direction. Note that FIG. 10B is a schematic illustration to describe the effect of the present exemplary embodiment. In reality, such an assembling technique cannot be employed since the drive gear 9a is interfered with the protrusion 17i.

In FIG. 10A, the size relationship between the drive gear 9a and the shaft supporting member 17 is given as follows:

$$R1<Y1, \text{ and } R2<Y2 \qquad (3).$$

Accordingly, the shaft supporting member 17 can be assembled with the drive gear 9a without interfering with each other.

In FIG. 10B, since the larger radius R1 of the drive gear 9a is larger than the size Y2 of the shaft supporting member 17, the drive gear 9a and the protrusion 17i interfere with each other. At that time, if the size X1 of the drive gear 9a is smaller than the size X2 of the shaft supporting member 17, the drive gear 9a and the protrusion 17i do not interfere with each other even when the drive gear 9a is mounted in a wrong direction as illustrated in FIG. 10C.

Thus, according to the present exemplary embodiment, by setting X1 to a size larger than X2, a structure in which the drive gear 9a is reliably interfered by the protrusion 17i if the drive gear 9a is mounted in a wrong direction is provided.

As described above, the condition that prevents the drive gear 9a from being mounted in a wrong direction is expressed as follows:

$$R1>Y2, \text{ and } X1>X2 \qquad (4).$$

Note that according to the present exemplary embodiment, by providing the drive gear 9a with two radii and providing the protrusion to the shaft supporting member 17, a structure that prevents the drive gear 9a from being mounted in a wrong direction is provided. However, the present invention is not limited to the structure.

Figure 11A:
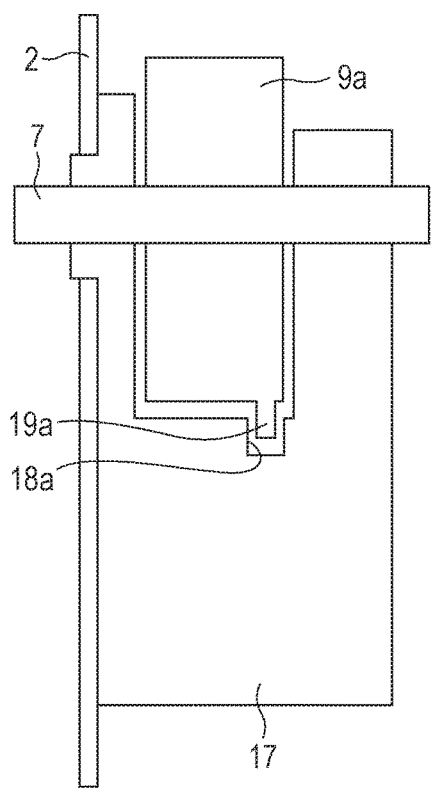
FIGS. 11A and 11B illustrate the shapes of the rotary member and the shaft supporting member according to the third exemplary embodiment.
Figure 11B:
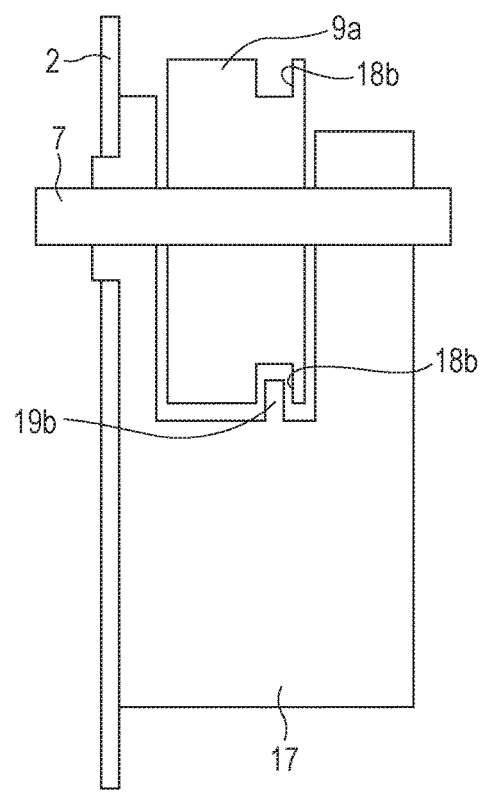

For example, as illustrated in FIG. 11A, a recess portion 18a may be provided to the shaft supporting member, and a projecting portion 19a of the rotary member may enter the recess portion 18a. In such a case, if the rotary member is mounted in a wrong direction, the projecting portion 19a cannot enter the recess portion 18a. Thus, assembling cannot be performed. In this manner, mounting of the drive gear 9a in a wrong direction can be prevented. Similarly, as illustrated in FIG. 11B, a recess portion 18b may be provided to the rotary member, and a projecting portion 19b may enter the recess portion 18b. In this manner, mounting of the drive gear 9a in a wrong direction can be also prevented.

While the first to third exemplary embodiments have been described with reference to the drive transmission device that transmits a drive to the pickup roller 4, the configuration is not limited thereto. For example, a drive may be transmitted to the conveyance roller that conveys a sheet. Alternatively, in addition to the conveyance roller, the drive transmission device may be applied to any configuration that transmits a drive to a rotary member using a shaft. In addition, the structure that prevents mis-assembly described in the third exemplary embodiment may be applied to the form of the shaft supporting member described in the second exemplary embodiment.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-251341 filed Dec. 11, 2014 and No. 2015-171909 filed Sep. 1, 2015, which are hereby incorporated by reference herein in their entirety.

What is claimed is:

1. A drive transmission device comprising:
    a driving shaft;
    a shaft supporting member including:
        a first bearing portion configured to support the driving shaft;
        a second bearing portion configured to support the driving shaft;
        a connecting portion configured to connect the first bearing portion and the second bearing portion; and
        a positioning portion which is disposed on a straight line that is the same as an axis of the driving shaft,
        wherein the first bearing portion, the second bearing portion, the connecting portion, and the positioning portion are formed as one piece and are not separate from each other,
    a first gear configured to rotate about the driving shaft, the first gear being disposed between the first bearing portion and the second bearing portion;
    a screw; and
    a frame to which the shaft supporting member is attached, the frame having:
        a positioning hole, wherein the positioning portion is fitted into the positioning hole to position the shaft supporting member with respect to the frame;
        a screw hole to attach the shaft supporting member to the frame using the screw, wherein the screw is inserted into the screw hole in a direction parallel with an axial direction of the driving shaft;
    a second gear configured to rotate about a shaft fixed to the frame, the first gear and the second gear being meshed with each other and configured to transmit a driving force from a motor,
    wherein a center of the positioning portion is disposed on the straight line that is the same as the axis of the driving shaft, and in a state where the shaft supporting member is attached to the frame, the driving shaft and the shaft fixed to the frame are in parallel.

2. The drive transmission device according to claim 1, wherein a shape of the positioning portion is a circular arc.

3. The drive transmission device according to claim 1, wherein a material used for the shaft supporting member is electrically conductive.

4. The drive transmission device according to claim 1, wherein the positioning portion has an insertion hole thereinside, and the driving shaft passes through the insertion hole.

5. The drive transmission device according to claim 1, wherein the frame to be attached is a plate-like frame, and wherein the driving shaft has the first gear and another gear member attached thereto so that the first gear and the another gear member are located on either side of the frame.

6. The drive transmission device according to claim 1, wherein the second bearing portion is supported by the connecting portion in a cantilever fashion.

7. The drive transmission device according to claim 1, wherein the first gear includes a one-way clutch.

8. The drive transmission device according to claim 1, wherein the first bearing portion has an attaching surface perpendicular to the straight line, and
    the frame to be attached has a surface to be attached to which the shaft supporting member is attached, and
    wherein the positioning hole is formed in the surface to be attached, and
    the attaching surface is in contact with the surface to be attached.

9. The drive transmission device according to claim 1, wherein the first gear includes a first rotary portion having a radius of R1 and a second rotary portion having a radius of R2 that is smaller than R1,
   wherein the first rotary portion and the second rotary portion are disposed at different positions in the axial direction of the driving shaft,
   wherein the connecting portion includes a first portion and a second portion, a shortest distance between the first portion and the straight line is Y1, a shortest distance Y2 between the second portion and the straight line is shorter than Y1, and
   the first portion and the second portion are disposed at different positions in the axial direction of the driving shaft, and
   wherein R1<Y1, R2<Y2, R1>Y2, and X1>X2, where X1 represents a width of the first gear in the axial direction of the driving shaft, and X2 represents a length of the first portion in the axial direction of the driving shaft.

10. The drive transmission device according to claim 1, wherein the first gear has a projecting portion, and
   the shaft supporting member has a recess portion, and
   wherein the projecting portion enters the recess portion.

11. The drive transmission device according to claim 1, wherein the first gear has a recess portion, and
   the shaft supporting member has a projecting portion, and
   wherein the projecting portion enters the recess portion.

12. The drive transmission device according to claim 1, wherein the shaft supporting member is integrally molded.

13. The drive transmission device according to claim 1, wherein the first gear is a gear having only one gear between the first bearing portion and the second bearing portion.

14. The drive transmission device according to claim 1,
   wherein the shaft supporting member further includes a fastening hole, and
   wherein the shaft supporting member is attached to the frame with the screw engaging the screw hole through the fastening hole.

15. The drive transmission device according to claim 1, wherein a surface of the frame to be attached contacting with the shaft supporting member at a position between the positioning hole and the screw hole is flat.

* * * * *